US007614765B2

(12) United States Patent
Reason

(10) Patent No.: US 7,614,765 B2
(45) Date of Patent: Nov. 10, 2009

(54) EMERGENCY PRESSURE-SWITCH ACTUATED LASER LIGHTING DEVICE FOR FIREFIGHTERS

(75) Inventor: Richard E. Reason, Woodland Park, CO (US)

(73) Assignee: Bright Ideaz Inc., Woodland Park, CO (US)

( * ) Notice: Subject to any disclaimer, the term of this patent is extended or adjusted under 35 U.S.C. 154(b) by 0 days.

(21) Appl. No.: 11/703,349

(22) Filed: Feb. 7, 2007

(65) Prior Publication Data

US 2008/0170383 A1 Jul. 17, 2008

Related U.S. Application Data

(60) Provisional application No. 60/880,092, filed on Jan. 12, 2007.

(51) Int. Cl.
*G02B 27/20* (2006.01)

(52) U.S. Cl. ....................... 362/259; 362/184; 362/191; 362/231; 362/802

(58) Field of Classification Search ................. 362/259, 362/184, 231, 202, 205, 208, 553, 200
See application file for complete search history.

(56) References Cited

U.S. PATENT DOCUMENTS

| | | | | |
|---|---|---|---|---|
| 2,739,746 | A * | 3/1956 | Hayes et. al. | 224/610 |
| 6,724,467 | B1 * | 4/2004 | Billmers et al. | 356/5.04 |
| 6,864,799 | B2 * | 3/2005 | Popps et al. | 340/693.5 |
| 2001/0014020 | A1 * | 8/2001 | Son | 362/259 |
| 2002/0030600 | A1 | 3/2002 | Starner et al. | |
| 2004/0012962 | A1 * | 1/2004 | Wolf | 362/259 |
| 2004/0095759 | A1 * | 5/2004 | Koch et al. | 362/205 |
| 2004/0263074 | A1 * | 12/2004 | Baroky et al. | 313/512 |

FOREIGN PATENT DOCUMENTS

GB 2309288 A * 7/1997

* cited by examiner

*Primary Examiner*—Jong-Suk (James) Lee
*Assistant Examiner*—Kevin Spinella
(74) *Attorney, Agent, or Firm*—Potomac Patent Group PLLC

(57) ABSTRACT

A device for providing emergency lighting for firefighters is described. The device includes a housing having at least one laser disposed therein. A power source powers the at least one laser when the device is activated. The device can be activated using, for example, a pressure-activated switch, a smoke-activated switch, a heat-activated switch, or the like.

12 Claims, 4 Drawing Sheets

EMERGENCY PRESSURE-SWITCH ACTUATED LASER LIGHTING DEVICE FOR FIREFIGHTERS

RELATED APPLICATION

This application is related to, and claims priority from, U.S. Provisional Patent Application Ser. No. 60/880,092, filed on Jan. 12, 2007, entitled "Emergency Lighting Devices for Firefighters", the disclosure of which is incorporated here by reference.

BACKGROUND

Around the world firefighters risk their lives by blindly entering smoke-filled structures hundreds of times a day. To avoid the choking smoke which obstructs their vision they often crawl along the floor. This helps them evade the intense heat as well as thick smoke. Innovation has provided this profession with many tools to deal with these harsh environments—items such as protective garments, oxygen masks, helmets and flashlights. These tools provide some aid in their endeavor to save lives and property.

However, there are problems with the existing technologies. Many people believe that the greatest danger to a fireperson is the risk of the fire itself. While it is true that being burned is a hazard, smoke claims more lives than the flames. In addition to smoke inhalation itself, firefighters become disorientated and may be unable to find egress or be rescued due to thick smoke in, e.g., burning buildings.

When attempting to navigate a smoke-filled structure the best flashlight on the market today is not able to provide much help. This is because flashlights use white or incoherent light. This full spectrum light illuminates the smoke molecules which reflect the light, thereby reducing penetration of the flashlight's beam through the smoke. Several lighting innovations have been introduced in recent years. For example, a so-called "rope" light has been introduced which the firefighter must pull along the floor when entering a burning structure in an attempt to mark his path to egress and to indicate to others where he/she has been in the burning structure. There are various problems with this solution to marking and illuminating paths within burning, smoke-filled structures. For example, the rope light will have a limited length, it may get tangled or caught on objects within the structure and may add significantly to the weight carried by a firefighter, depending upon the length of rope provided.

More recently, an emergency lighting device for firefighters has been described in U.S. Pat. No. 6,864,799, hereafter referred to as the "'799 patent". The '799 patent describes a safety device for firefighters usable to mark a viable exit for a building. The safety device includes an audible sounder and a number of laser diodes in a housing with lenses that create panes or sheets of light. The housing of the device can have prongs that allow the device to pierce drywall to mount it near a door or window, as well as an adhesive or cement for mounting on other vertical surfaces. The housing also has a tapered wedge shape and can wedge a door in an open position. There can be, for example, four laser diodes oriented at various angles within the device described by the '799 patent.

Although the device described in the '799 patent does use coherent light, rather than the incoherent light supplied by flashlights, it suffers from a number of potential drawbacks associated with its usage in certain real-life firefighting situations. For example, the creation of panes or sheets of light by the device described in the '799 patent will provide poor penetration of the smoke in burning structures, making it hard to see by firefighters seeking egress. Additionally, the use of a toggle switch on the side of the device to activate/deactivate the device will likely be problematic to operate for a firefighter wearing bulky, fire resistant gloves. Additionally, such a toggle switch may be easily triggered inadvertently, potentially rendering the device unusable if the battery is drained.

Accordingly, it would be desirable to develop emergency lighting devices for firefighters which overcome these and other drawbacks associated with existing devices and methods.

SUMMARY

According to an exemplary embodiment, a device for providing emergency lighting for firefighters includes a housing, at least two lasers, one of the two lasers having an output facing a first end of the housing and another of the two lasers having an output facing a second end of the housing, the second end of the housing being opposite to the first end of the housing, wherein each of the two lasers are offset from a respective one of the first and second ends of the housing by a predetermined distance, a power source for powering the at least two lasers, a pressure-activated switch for connecting the at least two lasers to the power source when at least a predetermined amount of pressure is applied thereto, thereby actuating the at least two lasers to generate at least two beams of coherent light outward from the housing, and further wherein the housing has a length of between 3-6 inches and a width of between 0.75-2.5 inches.

According to another exemplary embodiment, a device for providing emergency lighting for firefighters includes a housing, at least one laser disposed within the housing, a power source for powering the at least one laser, and a pressure-activated switch for connecting the at least one laser to the power source when at least a predetermined amount of pressure is applied thereto, thereby actuating the at least one laser to generate at least one beam of coherent light outward from the housing.

According to still another exemplary embodiment, a device for providing emergency lighting for firefighters includes a housing, at least one laser disposed within the housing, a power source for powering the at least one laser, and a spike attached to the housing, wherein the spike also operates as a switch for connecting the at least one laser to the power source.

According to yet another exemplary embodiment, a set of emergency lighting devices includes a first set of devices each having at least one laser which emits a coherent light beam within a first range of wavelengths, perceived visually as a first color, and a second set of devices each having at least one laser which emits a coherent light beam within a second range of wavelengths, perceived visually as a second color.

According to still another exemplary embodiment, a method for providing emergency lighting for firefighters includes providing an emergency lighting unit including a housing, at least one laser disposed within the housing and a power source for powering the at least one laser, and applying a predetermined amount of force to a portion of the housing to activate a pressure-activated switch affixed thereto; and actuating the at least one laser to generate at least one beam of coherent light outward from the housing in response to the applying the predetermined amount of force.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 2(*b*) and 2(*c*) show side view block diagrams of the emergency lighting device of FIG. 2(*a*);

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
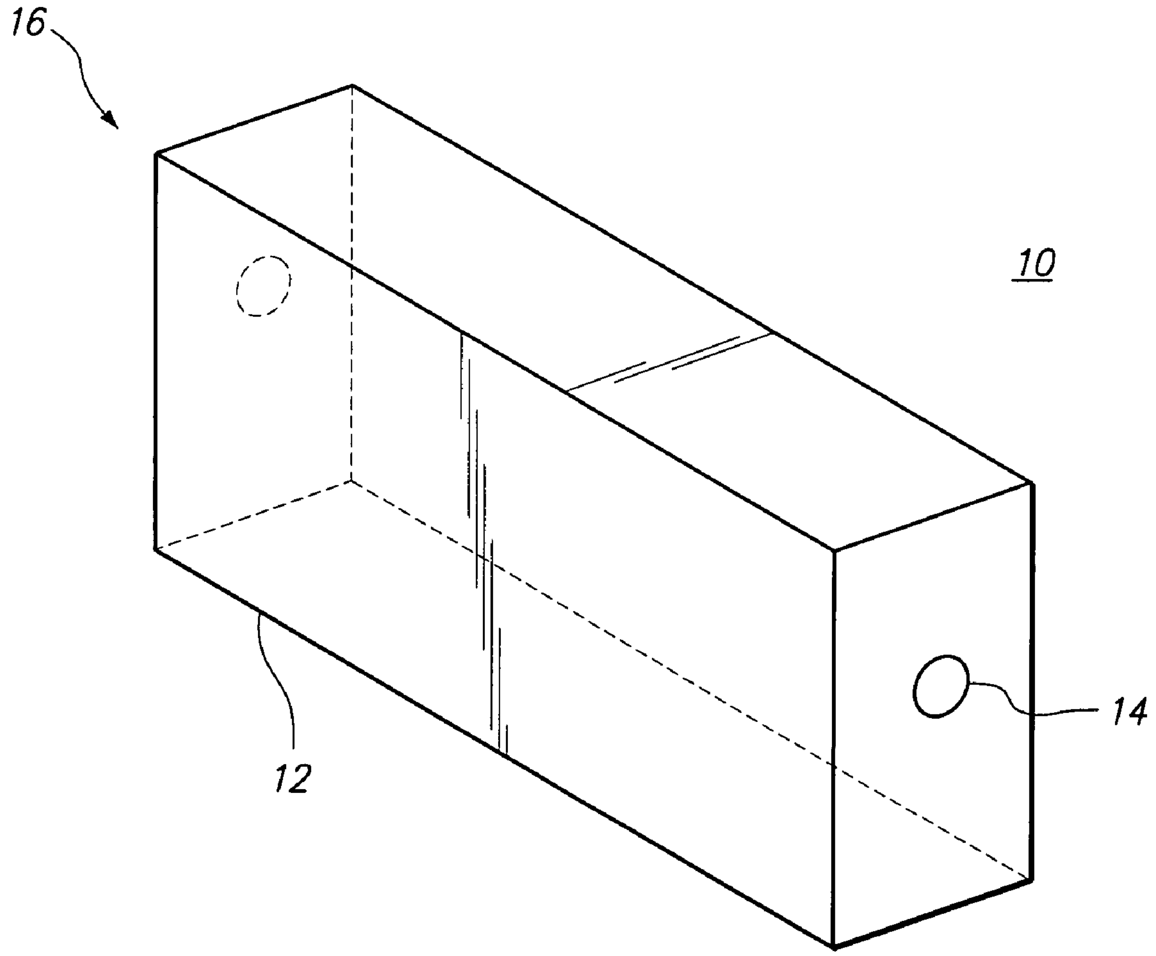
FIG. 1 illustrates an exterior perspective view of an emergency lighting device according to an exemplary embodiment.

As mentioned above, it would be desirable to provide an emergency lighting device for firefighters which provides light which penetrates thick smoke generated by, for example, a burning structure and which also overcomes the other deficiencies associated with the device described in the '799 patent to better provide fire fighting personnel a manner of finding egress in smoke filled environments and also aid in their rescue in the event of disorientation or injury. Exemplary embodiments of the present invention achieve these objectives, and others, by providing a device such as that illustrated in FIG. 1.

Therein, according to one exemplary embodiment, an emergency lighting device is fabricated as a small, self-contained laser illumination device 10. This device 10 can be placed along the floor or adhered to the wall as the firefighter enters a structure, thereby marking his/her path to egress and at the same time indicating his/her location. Additionally, placement of these devices will identify, to other firefighting personnel, areas which have already been searched. In the event a firefighter becomes disabled or injured the laser marker will aid others to locate him/her providing more efficient and timely rescue. It will be appreciated that the size of the device may be important for certain applications. For example, according to some exemplary embodiments, it is desirable that the housing 12 be small enough so that a firefighter can easily carry a large number of these devices to illuminate a number of different areas, but large enough that they are easy to handle while wearing large, firefighting gloves. Thus, according to some exemplary embodiments of the present invention, this means a housing 12 which is within the range of 3-6 inches long and 0.75-2.5 inches wide, although other exemplary embodiments of the present invention may have different dimensions. The housing 12 can be fabricated from a heat resistant material, e.g., nylon or a high density plastic. The housing 12 also includes portals or openings 14 and 16 at each end from which the coherent light beams generated by the lasers (not shown in FIG. 1) emanate when the device 10 is activated. According to one exemplary embodiment, (seen in FIG. 2(*a*)), the lasers are offset from a respective one of the first and second ends of the housing by a predetermined distance, e.g., ⅛ of an inch-¼ of an inch. These recesses provide some protection to the lasers from the heat of the environment in which the device 10 is anticipated to be used without the need for protective lenses or caps, which lenses or caps would absorb some of the energy of the laser beam passing therethrough.

Alternatively, the portals or openings 14 and 16 may each have a transparent cover (not shown) which provide a transmissive surface through which the coherent light beams can pass. The covers, if provided, can be fabricated from a material, e.g., a Mylar type material or coated glass tuned to the appropriate frequency, that will protect the lasers, but which substantially avoids modifying the characteristics of the coherent light beams as they are output from the lasers, and preferably from a material with minimal optical absorption characteristics to provide the strongest possible beam. This enables the lasers 20 and 22 to generate focused beams of light, rather than, e.g., sheets or panes of light, which focused beams of light will penetrate thick smoke more readily (than sheets or panes of light) when the device 10 is activated.

Figure 2A:
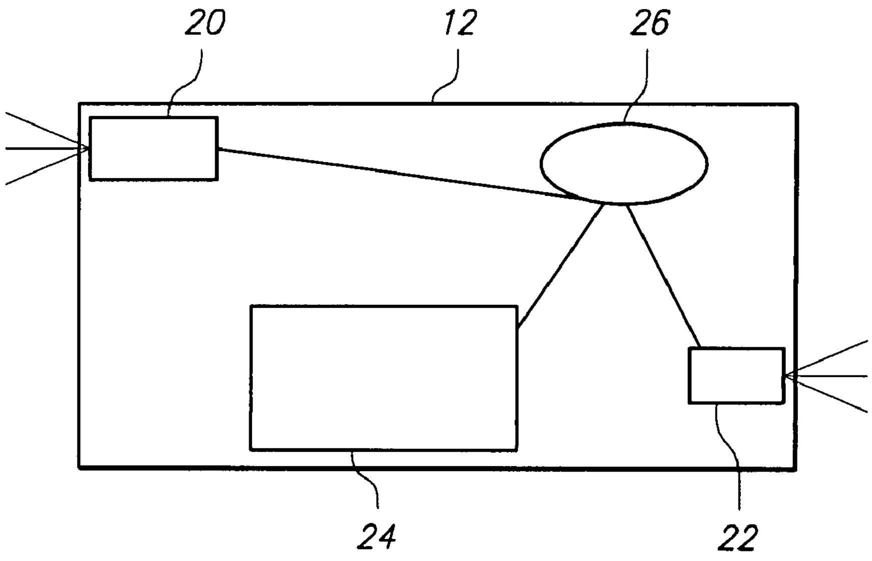
FIG. 2(*a*) shows a top view block diagram of an emergency lighting device according to an exemplary embodiment.
Figure 2B:
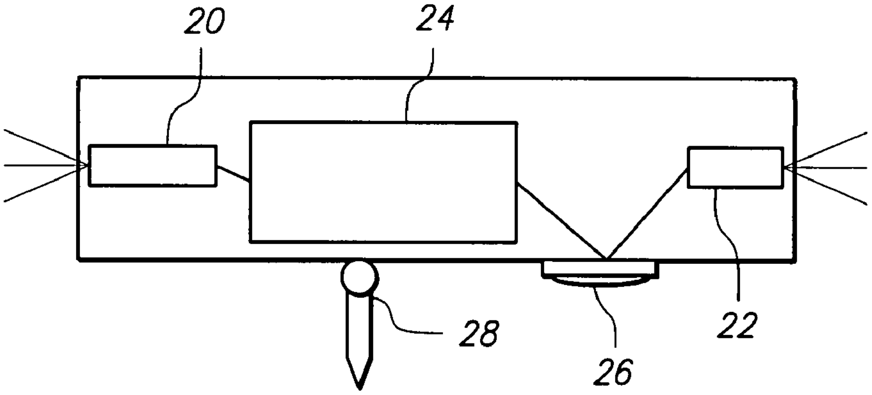
Figure 2C:
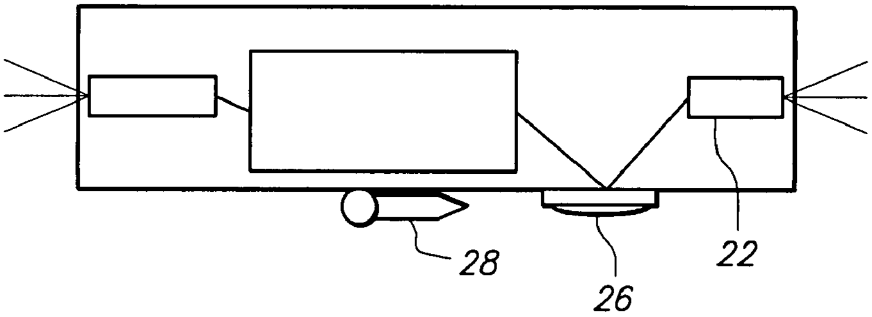

Turning to FIG. 2(*a*), components inside the housing 12 according to one exemplary embodiment of the present invention are shown as part of a top view of the device 10. Therein, a first laser 20 is operable to emit a first coherent light beam out through portal 16, while a second laser 22 is operable to emit a second coherent light beam out through portal 14. More or fewer than two lasers can be provided according to other exemplary embodiments. As mentioned above, the lasers 20 and 22 can be offset from their respective housing walls, as shown. The lasers 20 and 22 are selectively powered by battery 24, e.g., when switch 26 connects the battery 24 to each of the lasers 20 and 22 upon activation by a firefighter. The battery 24 can be a rechargeable battery. According to one exemplary embodiment, shown in FIG. 2(*b*), the switch 26 is implemented as a pressure-activated switch, i.e., a switch which will only activate after it senses a force thereon which exceeds a predetermined level. According to this exemplary embodiment, when the switch 26 is pressed against a surface, e.g., a floor or wall in a burning structure, the pressure activates the switch 26, thereby applying power to the lasers 20 and 22 to generate the coherent beams of light.

As mentioned above, the use of a toggle switch such as that illustrated in the '799 patent in conjunction with such a device may make it difficult for a firefighter to operate when wearing thick, bulky, fire-resistant gloves or, alternatively, may too easily be toggled into the "ON" position while disposed in a firefighter's jacket pocket, thereby depleting the battery unnecessarily. Thus using a pressure-activated switch 26 provides the advantage that it will be activated upon use of the device 10 without the need for separate motions to affix and activate the device 10. However, those skilled in the art will appreciate that other types of switches can also be used, preferably those which also would not require a separate motion to activate the unit, but which also would typically not turn on unless the device 10 was positioned within its expected operating environment or moved into an operating position (e.g., attached to a wall or floor). For example, switch 26 could alternatively (or additionally) be implemented as a chemically activated switch a smoke activated switch, or a thermally activated switch, e.g., a switch which turns on when the sensed temperature rises above a predetermined temperature.

Also shown in FIG. 2(*b*) is a spike or fastener 28 that can be used to adhere the device 10 to the selected surface (not shown). According to one exemplary embodiment, the spike or fastener 28 can be foldable so that it folds up against a bottom of housing 12 until such time as the firefighter is ready to activate the device. The unfolding of the spike can serve to activate the device 10, e.g., by triggering the switch 26 to connect the battery 24 to the lasers 20, 22. This latter exemplary embodiment has the advantage of reducing the footprint of the device when not in use, however it also requires the firefighter to make an additional motion to prepare the device for use, i.e., unfolding the spike. A spring-loaded spike 28 in conjunction with a device holder, described below with respect to FIG. 3, addresses this issue. Alternatively, according to another exemplary embodiment of the present invention, the spike or fastener 28 is not foldable, but is instead fabricated fixedly in the position shown in FIG. 2(*b*), i.e., perpendicular to a bottom of the housing 12, so that it is immediately ready for use by a firefighter. It will be appreciated that other types of adherents can be substituted for, or used in addition to, spike or fastener 28, e.g., chemical adhesives, tape-like adhesives, etc.

Regardless of the particular type of spike, fastener or adherent used in conjunction with device 10, it will be appreciated that a number of the devices 10 can be carried by each firefighter to provide various information to others fighting a fire. An exemplary carrying device which enables a firefighter to carry a plurality of the devices 10 is described below. For example, the devices 10 can be affixed within a burning structure to provide a lit path demarking the firefighter's location relative to a point of entry. Additionally, since firefighters frequently employ a so-called right or left-hand "crawl" search, which procedure requires firefighters to follow wall perimeters within a burning structure, these devices 10 could be placed by the first firefighters to enter and search a burning structure and enable subsequent firefighters to move more rapidly through marked and lit areas.

According to another exemplary embodiment the color of the coherent light beams generated by the device 10 can be selected to provide additional information. Lasers emit coherent light beams whose perceived color is a function of their output wavelength, e.g., red, green, violet and purple. According to one exemplary embodiment, each of laser(s) disposed within a device 10 may emit coherent light of the same color, however different devices 10 may emit a different color light. Then, for example, devices 10 emitting a first color of coherent light (e.g., green) may be distributed to firefighters having emergency medical training (EMP) while those firefighters who do not have EMP training may carry devices 10 which emit a second, different color of coherent light (e.g., violet). In this way, if a firefighter needs to quickly locate an EMP-trained firefighter in a burning structure, the color coding of the emitted light beams will lead him or her quickly to the correct firefighter despite the potentially dense smoke in the building. More generally, different color emissions from devices 10 can be used to denote different types of firefighting personnel, e.g., leaders, medical personnel, etc.

From the foregoing, it will be appreciated that an exemplary embodiment of the present invention provides for a set of emergency lighting devices including a first set of devices each having at least one laser which emits a coherent light beam within a first range of wavelengths, perceived visually as a first color, and a second set of devices each having at least one laser which emits a coherent light beam within a second range of wavelengths, perceived visually as a second color. Alternatively, lasers within each device 10 can be provided having different color (wavelength emissions). For example, laser 20 in the device 10 of FIG. 2(*a*) can generate a wavelength output in the red spectrum, while laser 22 in the device 10 can generate a wavelength output in the green spectrum. A selection switch (not shown) can be provided to configure the device such that, when activated, the device 10 either emits a red beam of coherent light via laser 20 or a green beam of coherent light via laser 22.

When a room in a burning structure has been searched by a firefighter, she or he will typically mark the door or opening to that room to indicate that it has been searched, e.g., by hanging a marker on a doorknob. Devices 10 can also be used to indicate that a room has been searched by affixing a device 10 proximate a room that has been searched. Additionally, a code or pattern associated with the placement of devices 10 relative to a door or entryway can be used to provide additional information to other firefighters who approach the previously searched room. For example, the device 10 can be oriented relative to the doorway, e.g., such that the emitted beam(s) are parallel to the height dimension of the doorway (e.g., 6/12 o'clock) or, alternatively, such that the emitted beams(s) are perpendicular to the height dimension of the doorway (e.g., 3/9 o'clock).

Figure 3:
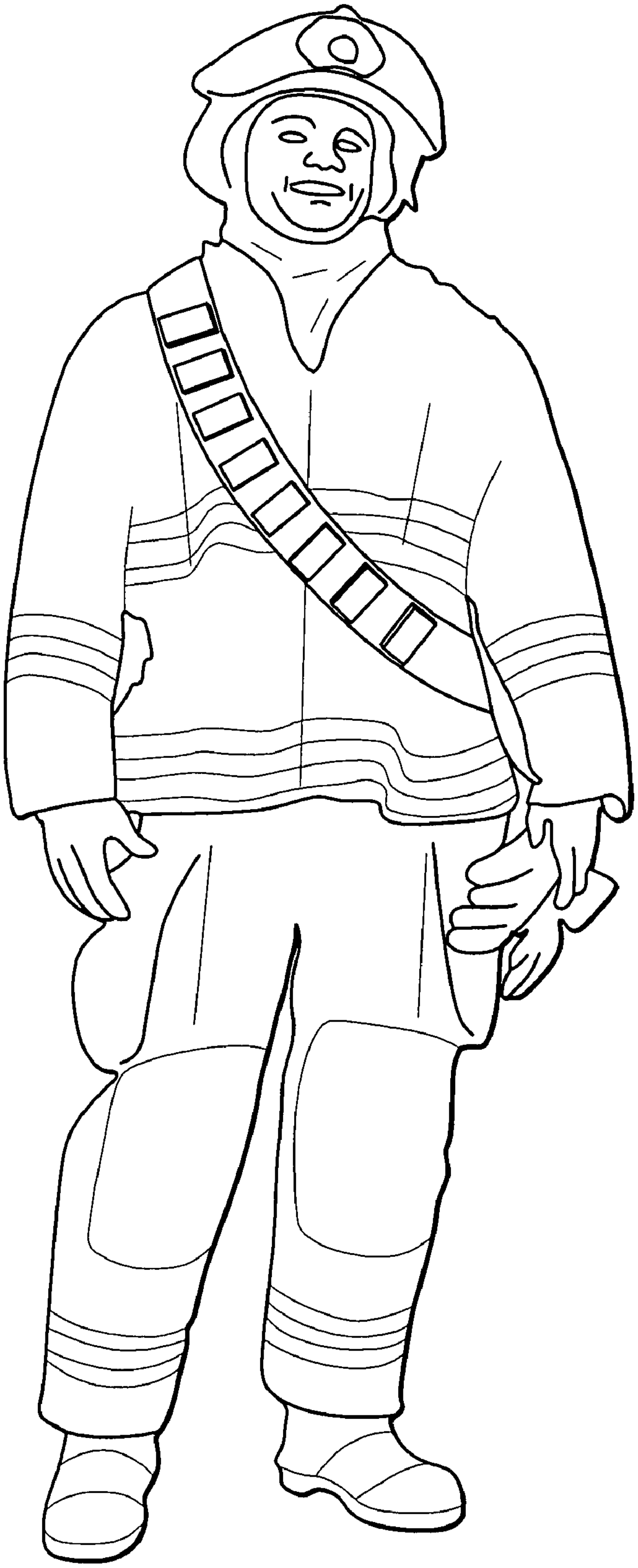
FIG. 3 illustrates a firefighter wearing a bandoleer having a plurality of emergency lighting devices according to an exemplary embodiment.

Those skilled in the art will appreciate that these exemplary embodiments provide for an emergency lighting device that is a small, lightweight unit (e.g., about the size of a cigarette pack) having a heat resistant housing containing a switch, battery and lasers at each end of the unit. Due to the compact size and lightweight nature of these devices, a firefighter can carry multiple units to place at various distances along their path into a structure. For example, as illustrated in FIG. 3, a firefighter can wear a bandoleer or the like which holds a number of devices 10. Then, when a device 10 is removed from the bandoleer, it will automatically activate for immediate usage by the firefighter. For example, if the spike or fastener 28 is folded up against the bottom of the housing 12, as described above, removing a device 10 from a holder on the bandoleer can result in the spike or fastener 28 automatically moving into an operational position, e.g., perpendicular to the housing 12, by way of a spring-loaded mechanism (not shown) which biases the spike into that position. Additionally, a locking mechanism (not shown) can be provided to lock the spike 28 into the perpendicular position to provide rigidity so that it is easier to drive into a surface. Alternatively, a "normally closed" switch 26 can be employed such that when the device 10 is removed from the bandoleer it will be automatically activated independent of whether a spike 28 is provided or not.

Figure 4:
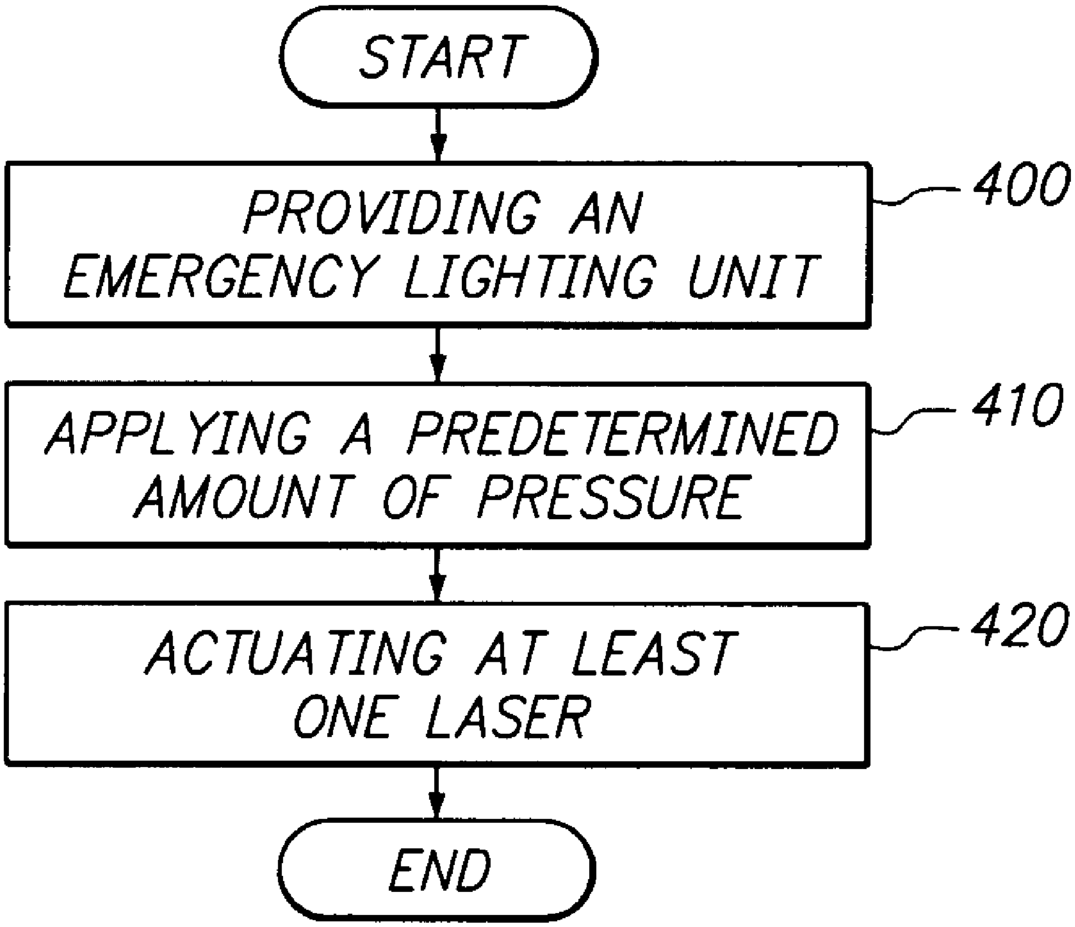
FIG. 4 is a flowchart illustrating a method according to an exemplary embodiment.

Thus it will be appreciated that a method for providing emergency lighting for firefighters according to exemplary embodiments includes a number of steps, an example of which is shown in the flowchart of FIG. 4. Therein, at step 400, an emergency lighting unit including a housing, at least one laser disposed within the housing and a power source for powering the at least one laser is provided, e.g., to a firefighter or other emergency personnel. Then, a predetermined amount of force can be applied to a portion of the housing to activate a pressure-activated switch affixed thereto at step 410. In this context, a predetermined amount of force can be something greater than zero and also greater than that which might be applied to the pressure switch accidentally or in non-emergency use. For example, the pressure threshold should be great enough, according to some exemplary embodiments, that placing it in one's pocket, accidentally touching the pressure switch or sliding it into a loop on the bandoleer in FIG. 3 will not actuate the device. On the other hand, the predetermined amount of force should be low enough that plunging the unit into, e.g., a sheet of drywall, until the pressure switch hits the surface will trigger activation. When the predetermined amount of force is applied, then the at least one laser will be actuated at step 420 to generate at least one beam of coherent light outward from the housing.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention. No element, act, or instruction used in the description of the present application should be construed as critical or essential to the invention unless explicitly described as such. Also, as used herein, the article "a" is intended to include one or more items.

What is claimed is:

1. A device for providing emergency lighting for firefighters, the device comprising:

a housing a plurality of having sides;

at least one laser disposed within said housing, said at least one laser having an output portal disposed in a first one of said plurality of sides of said housing;

a power source for powering said at least one laser;

a second one of said plurality of sides disposed perpendicular to said first one of said plurality of sides, said second one of said plurality of sides including an adhering element configured to adhere said housing to a surface; and a pressure-activated non-rocker switch, disposed on said second one of said plurality of sides, which only activates to turn on said at least one laser after sensing a force thereon which exceeds a predetermined level when said second one of said plurality of sides of said housing is adhered to said surface.

2. The device of claim 1, wherein said at least one laser includes two lasers, one of said two lasers having an output facing a first end of said housing and another of said two lasers having an output facing a second end of said housing, said second end of said housing being opposite to and generally parallel to said first end of said housing.

3. The device of claim 2, wherein each of said two lasers are offset from a respective one of said first and second ends of said housing by a predetermined distance.

4. The device of claim 3, further comprising:

a protective lens provided in front of each of said two lasers, wherein said lens does not substantially modify a shape of said beams of coherent light output from said two lasers.

5. The device of claim 2, wherein a first of said two lasers emits coherent light within a first wavelength range, and wherein a second of said two lasers emits coherent light within a second wavelength range, the first wavelength range being the same as the second wavelength range.

6. The device of claim 2, wherein a first of said two lasers emits coherent light within a first wavelength range, and wherein a second of said two lasers emits coherent light within a second wavelength range, the first wavelength range being different from the second wavelength range.

7. The device of claim 1, wherein said housing has a length of between 3-6 inches and a width of between 0.75-2.5 inches.

8. The device of claim 1, wherein said parallelepiped shaped housing is fabricated from a heat resistant material.

9. The device of claim 1, wherein said housing is a parallelepiped shaped housing.

10. The device of claim 1, wherein said second one of said plurality of sides of said housing has a surface area which is greater than a surface area of said first one of said plurality of sides of said housing.

11. The device of claim 1, wherein said adhering element is one of a spike, a chemical adhesive and a tape.

12. The device of claim 1, further comprising:

a protective lens provided in front of said at least one laser, wherein said lens does not substantially modify a shape of a beam of coherent light output by said at least one laser.

* * * * *

UNITED STATES PATENT AND TRADEMARK OFFICE

CERTIFICATE OF CORRECTION

PATENT NO. : 7,614,765 B2
APPLICATION NO. : 11/703349
DATED : November 10, 2009
INVENTOR(S) : Richard E. Reason It is certified that error appears in the above-identified patent and that said Letters Patent is hereby corrected as shown below:

In Column 7, Line 11, after “of”, delete “having”.

In Column 7, Line 11, after “housing”, insert --having--.

Signed and Sealed this

Twenty-ninth Day of December, 2009

David J. Kappos
*Director of the United States Patent and Trademark Office*